United States Patent
Chien

(10) Patent No.: US 9,712,790 B2
(45) Date of Patent: Jul. 18, 2017

(54) PLUG AND PLAY NETWORK SYSTEM, PLUG AND PLAY NETWORK VIDEO RECORDER, AND CONTROL METHOD THEREOF

(75) Inventor: Huang-Jen Chien, New Taipei (TW)

(73) Assignee: AV Tech Corporation, New Taipei (TW)

(*) Notice: Subject to any disclaimer, the term of this patent is extended or adjusted under 35 U.S.C. 154(b) by 921 days.

(21) Appl. No.: 13/417,846

(22) Filed: Mar. 12, 2012

(65) Prior Publication Data

US 2013/0147960 A1 Jun. 13, 2013

(30) Foreign Application Priority Data

Dec. 16, 2011 (TW) ............................ 100146869 A

(51) Int. Cl.
*H04N 7/18* (2006.01)
*H04L 29/12* (2006.01)
*H04L 12/28* (2006.01)

(52) U.S. Cl.
CPC ......... *H04N 7/181* (2013.01); *H04L 61/2015* (2013.01); *H04L 12/2825* (2013.01); *H04L 12/2834* (2013.01)

(58) Field of Classification Search
CPC ............. H04L 12/2825; H04L 12/2834; H04L 61/2015; H04N 7/181
See application file for complete search history.

(56) References Cited

U.S. PATENT DOCUMENTS

| | | | | |
|---|---|---|---|---|
| 5,499,040 A | * | 3/1996 | McLaughlin et al. | ........ 715/823 |
| 6,115,390 A | * | 9/2000 | Chuah | ................... H04L 1/1607 370/348 |
| 6,377,548 B1 | * | 4/2002 | Chuah | ................. H04L 12/2602 370/233 |
| 2002/0191567 A1 | * | 12/2002 | Famolari et al. | ............. 370/335 |
| 2004/0068756 A1 | * | 4/2004 | Chiu | ............................ 725/135 |
| 2005/0152287 A1 | * | 7/2005 | Yokomitsu et al. | .......... 370/255 |
| 2006/0285514 A1 | * | 12/2006 | Hoerl | ................... H04L 12/2602 370/328 |
| 2008/0022322 A1 | * | 1/2008 | Grannan et al. | ................ 725/78 |
| 2008/0247457 A1 | * | 10/2008 | Cromwell et al. | ....... 375/240.01 |
| 2009/0207866 A1 | * | 8/2009 | Cholas et al. | .............. 370/505 |

OTHER PUBLICATIONS

UPnP Forum, UPnP Device Architecture 1.1, Oct. 15, 2008, UPnP, pp. 1-136.*

* cited by examiner

*Primary Examiner* — Peter D Le
(74) *Attorney, Agent, or Firm* — Wang Law Firm, Inc.

(57) ABSTRACT

A plug and play network system, a plug and play network video recorder, and its control method. The network system comprises a remote browser device, a plurality of slave devices and a master device. When the slave devices are connected to the master device, each slave device can obtain its own IP address from a dynamic host configuration protocol unit disposed in the master device. Meanwhile, the master device can obtain the universal plug and play signal from each universal plug and play unit disposed in the slave devices. Thus, each signal capturing unit disposed in the slave devices can actively transmit the captured signal to the data processing unit in the master device. The data processing unit processes and transmits the captured signal to a remote browser device. The remote browser device displays the captured signal on the different sections of the screen thereof.

12 Claims, 7 Drawing Sheets

PLUG AND PLAY NETWORK SYSTEM, PLUG AND PLAY NETWORK VIDEO RECORDER, AND CONTROL METHOD THEREOF

CROSS-REFERENCE TO RELATED APPLICATION

This application claims the benefit of Taiwan Patent Application No. 100146869, filed on Dec. 16, 2011, in the Taiwan Intellectual Property Office, the disclosure of which is incorporated herein in its entirety by reference.

BACKGROUND OF THE INVENTION

1. Field of the Invention

The present invention relates to a network system, and more particularly to a plug and play network system, plug and play network monitoring system and its control method integrating dynamic host configuration protocol (DHCP) and universal plug and play protocol (UPNP protocol).

2. Description of the Related Art

Recently, security surveillance systems become necessary equipment in each building, private houses, departments and factories. A conventional digital video recorder (DVR) system has restricted functions, and each monitor must be connected to the DVR through a cable to cause inconvenience on wire arrangement. The foregoing manner may be spent with lots of labor force costs and time. Due to the foregoing problem, the DVR system may not be matched with era trend and is gradually replaced with a network video recorder (NVR) system.

The conventional NVR can connect IP cameras at different locations of the building with the NVR through hubs to simplify wire arrangement. However, the user or mechanist still needs to configure domains of each IP camera such that the IP camera is the same as the domain where the NVR is located. Therefore, the conventional NVR still needs to consume much labor force costs and time to configure the domain of each IP camera. In addition, the user or mechanists needs certain network equipment knowledge to perform installation work and the required technical threshold is extremely high. Developing a kind of NVR without complicated configuration procedure and high technical threshold becomes an important issue of the invention.

SUMMARY OF THE INVENTION

In view of the shortcomings of the prior art, the inventor (s) of the present invention based on years of experience in the related industry conducted extensive researches and experiments, and finally developed a plug and play network system, plug and play network monitoring system and its control method as a principle objective to overcome problems of complicated configuration procedure and the excessively high required technical threshold during the installation of a conventional IP camera system.

To achieve the foregoing objective of the invention, a plug and play network system is provided and includes a remote browser device; a plurality of slave devices, wherein each slave device comprises a signal capturing unit and an universal plug and play unit; and a master device; wherein when the plurality of slave devices is connected to the master device, the master device utilizes a DHCP unit to assign internet protocol addresses to each of the slave devices. Each of the universal plug and play units transmits a universal plug and play signal to the master device such that each of the signal capturing units can actively transmit a captured signal to a data processing unit. After processing by the data processing unit, the captured signal is then transmitted to the remote browser device and displayed at different locations on a screen.

According to the objective of the invention, a method for controlling a plug and play network system is provided and comprises the following steps of: while a master device to connect a plurality of slave devices; the master device assigns internet protocol addresses to each slave device by utilizing a DHCP unit; transmitting an universal plug and play signal to the master device through each of the universal plug and play units disposed in the plurality of slave devices; actively transmitting a signal captured by each of the signal capturing units disposed in the plurality of slave devices to a data processing unit of the master device, and transmitting the signal to the remote browser device and displaying the signal on the screen after processing by the data processing unit.

Preferably, the remote browser device sequentially displays the signal captured by each signal capturing unit at different locations on the screen according to a sequence of connecting each slave device to the master device.

Preferably, the remote browser device further includes a screen locking unit. When a user regulates the locations of the signal, which is captured by each of the signal capturing units, displayed on the screen, the screen locking unit would lock in the configuration of the user.

Preferably, when the slave device is connected to a host, the user is allowed to refuse to be connected by the slave device in a predetermined time period to resolve the problem for the preferable slave device that is unable to be selected by the user when the connected slave devices are more than the amount capable of being supported by the browser device.

Preferably, the universal plug and play signal transmitted to the master device through each of the universal plug and play units comprises an IP address, a vendor, a slave device model and a port number.

Preferably, the master device further comprises an account management unit, and when the plurality of slave devices is connected to the master device, the account management unit allows the data processing unit to access the signal captured by the signal capturing unit through a predetermined account number and a password or a specific account number and a password inputted by the user.

According to the objective of the invention, a plug and play network monitoring system is provided and includes a remote monitoring display; a plurality of internet protocol cameras, wherein each IP camera includes an image capturing unit and an universal plug and play unit; and a network video recorder (NVR); wherein when the plurality of IP cameras is connected to the NVR, the IP cameras utilize a DHCP unit to assign internet protocol addresses to each IP camera, and each of the universal plug and play units transmits an universal plug and play signal to the NVR such that each of the image capturing units actively transmits a captured image signal to the image data processing unit, and the captured image signal is then transmitted to the remote monitoring display and displayed at different locations on a screen after processing by the image data processing unit.

Preferably, the remote monitoring display sequentially displays the image signal captured by each of the image capturing units at the different locations on the screen according to a sequence of connecting each IP camera to the NVR.

Preferably, the remote monitoring display further comprises a screen locking unit, and when a user regulates the locations of the signal, which is captured by each of the image capturing units, displayed on the screen, the screen locking unit locks in a configuration of the user.

Preferably, the universal plug and play signal transmitted to the NVR via each universal plug and play unit comprises an internet protocol address, a vendor, a slave device model and a port number.

Preferably, the NVR further comprises an account management unit, and when the plurality of IP cameras is connected to the NVR, the account management unit allows the image data processing unit to access the image signal captured by the image signal capturing unit through a predetermined account number and a password or a specific account number and a password inputted by the user.

A plug and play network system, plug and play network monitoring system and its control method according to the invention have one or more advantages as the following:

1) The invention integrates the DHCP into the NVR. Huge labor force costs and time can be saved during the installation.
2) The invention integrates the UPNP protocol into the network monitoring system. Each IP camera would automatically transmit the captured image signal back. It is extremely convenient, and the technical threshold required for installation is low.
3) The invention integrates the screen locking unit into the remote monitoring display. The location for the image, which is captured by each IP camera, displayed on the screen may not be changed when the user wrongly touches an input device of the remote monitoring display, thereby being more user friendly.
4) The invention additionally allows the user to have a chance to select preferable slave devices, especially for the slave devices that are more than the amount capable of being supported by the browser device. At this time, since the browser device can randomly find the slave devices due to plug and play mechanism, the user can refuse to be connected by the slave device that is actively linked at a certain time through an operating interface on the browser device. The refused connection enables the browser device to automatically find another usable slave device.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
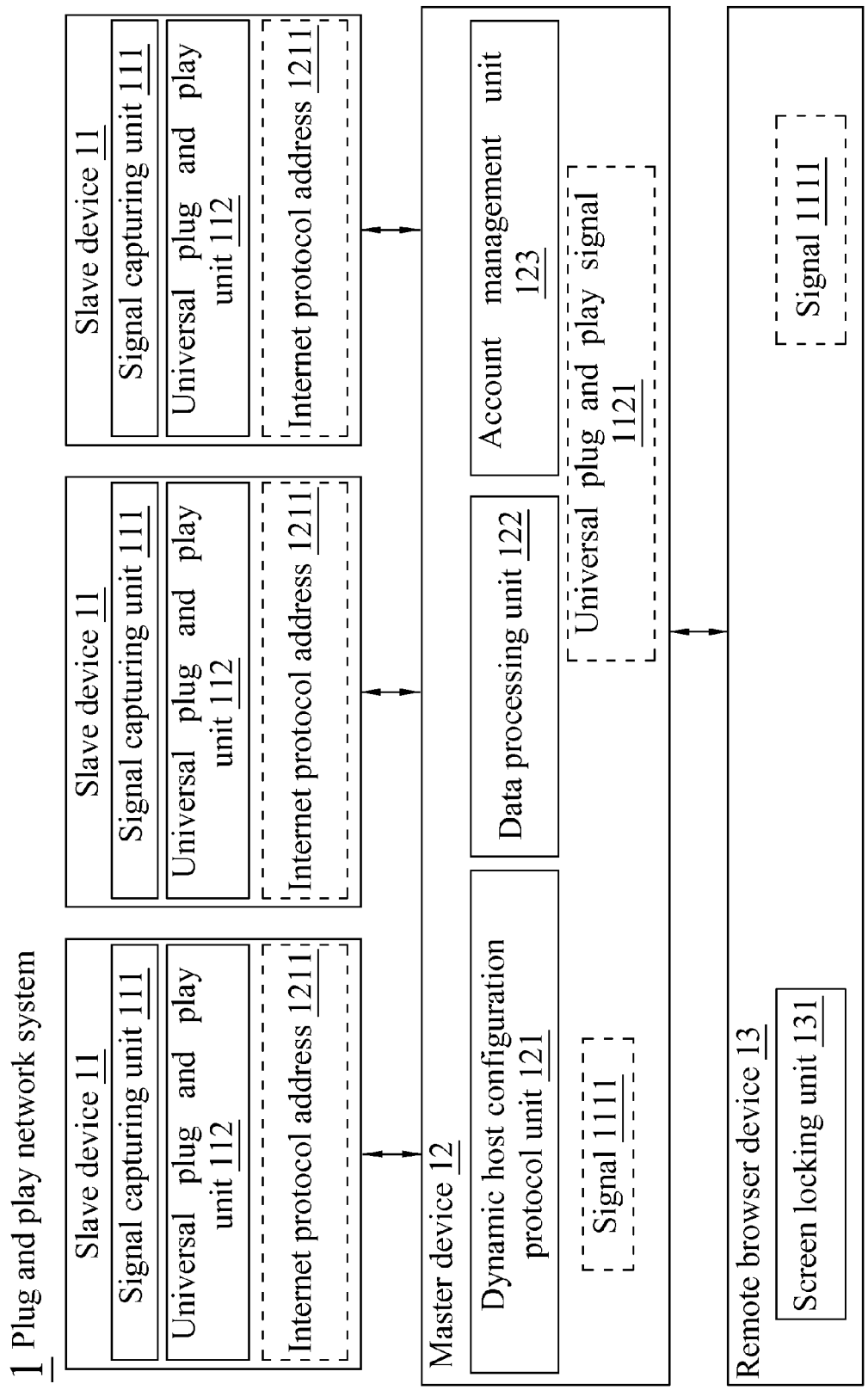
FIG. 1 is a block diagram of a plug and play network system according to a first embodiment of the invention.

With reference to FIG. 1 for a block diagram of a plug and play network system according to a first embodiment of the invention is depicted. As shown in the figure, the plug and play network system 1 comprises a plurality of slave devices 11, a master device 12 and a remote browser device 13, wherein each slave device 11 includes a signal capturing unit 111 and a universal plug and play unit 112. The master device 12 includes a dynamic host configuration protocol unit 121, a data processing unit 122 and an account management unit 123. The remote browser device 13 includes a screen locking unit 131.

The master device 12 is a dynamic host configuration protocol (DHCP) host. When the plurality of slave devices 11 is connected to the master device 12, the DHCP unit 12 would automatically assign IP address 1211 to each slave device 11 to allow the master device 12 to recognize the location of each slave device 11 in network. Only three slave devices, but not limited to, are drawn in the embodiment.

At this time, the universal plug and play unit 112 of each slave device 11 transmits a universal plug and play signal 1121 to the master device 12. By utilizing the mechanism of universal plug and play protocol (UPNP protocol), each slave device 11 actively transmits the signal 1111 captured by the signal capturing unit 111 to the data processing unit 122. The account management unit 123 obtains access right of the signal 1111 transmitted from each slave device 11 through a preset account number and a password. Afterwards, the data processing unit 122 performs processing. Of course, a user can also input a specific account number and a password through the remote browser device 13 to obtain the access right via the account management unit 123.

The universal plug and play signal 1121 can contain different kinds of information such as the IP address, vendor, slave device model, and port number of each slave device 11. A user can access the foregoing information through the remote browser device 13.

It should be noted that a conventional network system does not have plug and play function. When the plurality of slave devices is connected to the master device, each slave device does not actively transmit captured signal to the master device. Therefore, the user or an installation engineer still needs complicated configuration procedure to allow the master device to receive signals transmitted by each slave device. The user or the installation engineer needs certain network equipment knowledge to install the network system, and the required technical threshold is extremely high during the installation.

In addition, installing this kind of the network system may need to consume much labor force and time. It will also spend lots of money to complete the installation and configuration and may not satisfy economy benefits. Due to the foregoing reason, the invention integrates DHCP and UPNP protocols into various network systems so that the network system can be plugged and played to exactly improve the defect of prior arts.

The data processing unit 122 processes the received signal 1111 and then transmits the signal to the remote browser device 13. The remote browser device 13 respectively displays the signal 1111 captured by each signal capturing unit 111 on different locations on the screen. The user can freely regulate the location of the signal 1111 displayed on the screen. The remote browser device 13 of the invention further integrates a screen locking unit 131. The screen locking unit 131 can lock in the configuration of the user and remember the physical location of each signal source on the network. Even if the master device is restarted, the user does not need to re-configure again.

Of course, the user can refuse the slave device to connect to the master device through the operating interface of the remote browser device. Accordingly, when the slave devices are more than the amount capable of being supported by the browser device, the browser device would randomly find the slave device due to the mechanism of the plug and play. Consequently, the signal generated by the slave device that needs to be connected is unable to be displayed on the remote browser device. Therefore, the design of the invention can allow the user to refuse the slave device that is actively connected at a specific time through the operating interface of the browser device. The refused connection will enable the browser device to automatically find another slave device that can be used such that the user has the chance to select the preferable slave device.

Figure 2:
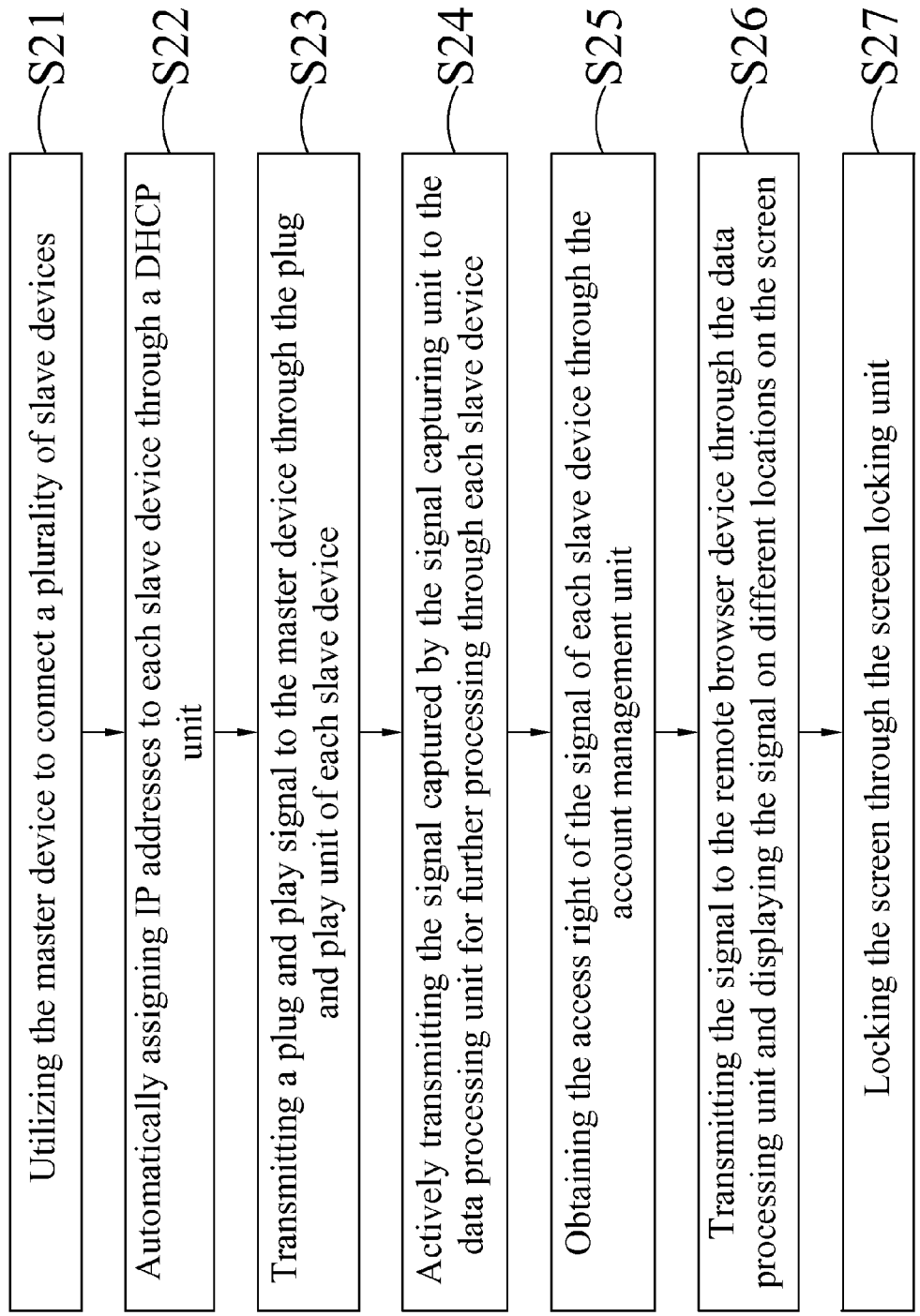
FIG. 2 is a flowchart of a plug and play network system according to a first embodiment of the invention.

With reference to FIG. 2 for a flowchart of a plug and play network system according to a first embodiment of the invention is depicted.

In step S21, the master device is utilized to connect a plurality of slave devices.

In step S22, IP addresses are automatically assigned to each slave device through a DHCP unit.

In step S23, a plug and play signal is transmitted to the master device through the plug and play unit of each slave device.

In step S24, the signal captured by the signal capturing unit is actively transmitted to the data processing unit for further processing through each slave device.

In step S25, the access right of the signal of each slave device is obtained through the account management unit.

In step S26, the signal to the remote browser device is transmitted through the data processing unit and then displaying the signal on different locations on the screen.

In step S27, the screen is locked through the screen locking unit.

Figure 3:
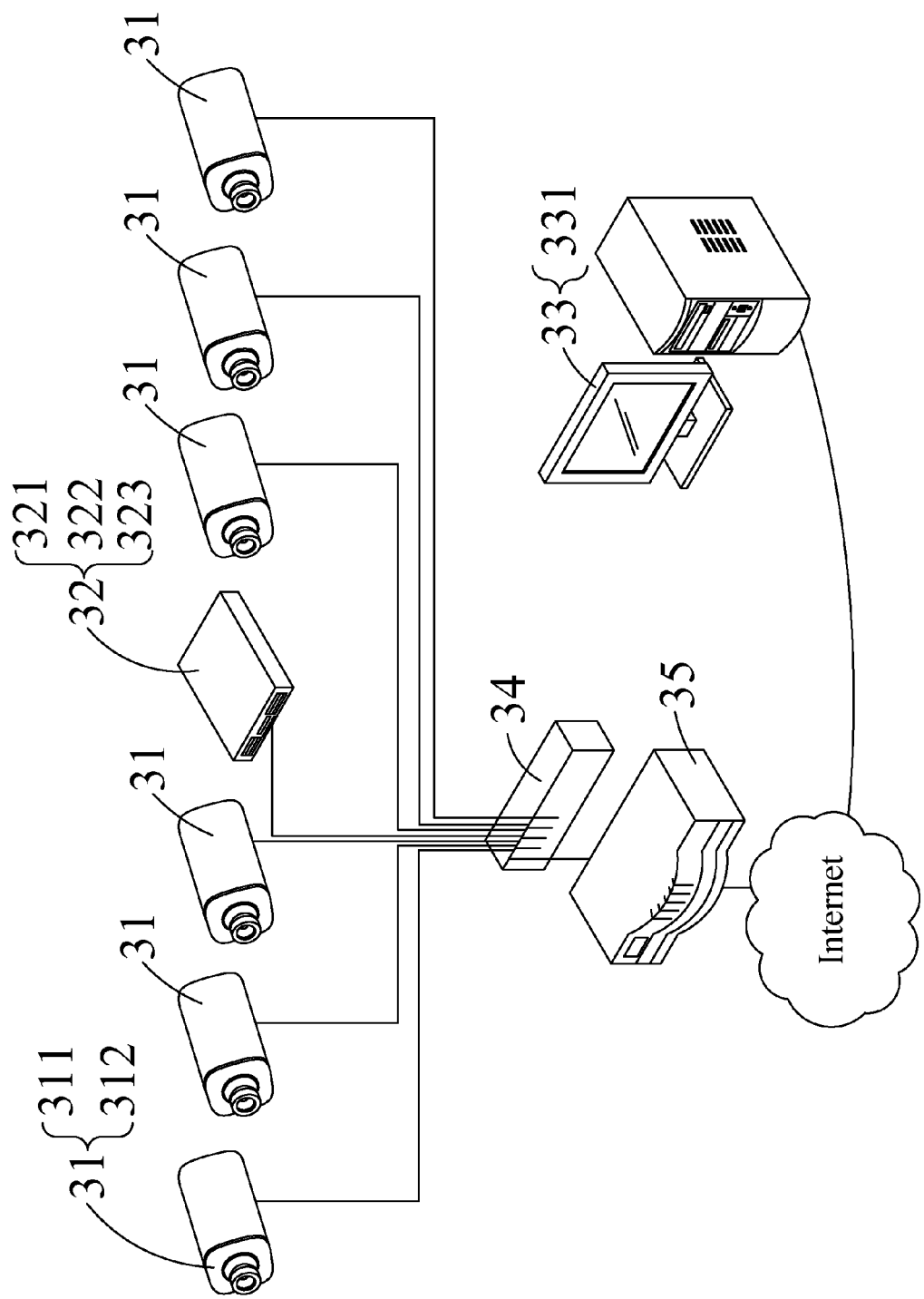
FIG. 3 is a schematic diagram of a plug and play network monitoring system according to a first embodiment of the invention.

With reference to FIG. 3 for a schematic diagram of a plug and play network system according to a first embodiment of the invention is depicted. As shown in the figure, the plug and play network monitoring system 3 includes a plurality of IP cameras 31, a network video recorder (NVR) 32 and a remote monitoring display 33, wherein each IP camera 31 includes an image capturing unit 311 and a universal plug and play unit 312. The NVR 32 includes a DHCP unit 321, an image data processing unit 322 and an account management unit 323. The remote monitoring display 33 includes a screen locking unit 331.

When the plurality of IP cameras 31 is connected to the NVR 32 through a hub 34, the DHCP unit 321 immediately distributes IP addresses to each IP camera such that the NVR 32 can recognize each IP camera 31 at the location of the network. Each plug and play unit 312 transmits the universal plug and play signal to the NVR 32. Afterwards, each IP camera 31 actively transmits the image signal captured by the image capturing unit 311 to the image data processing unit 322. The account management unit 323 obtains the access right of the image signal transmitted by each IP camera 31 through predetermined account numbers and passwords. Afterwards, the signal is then processed by the image data processing unit 322. Similarly, the user can input specific account numbers and passwords through the remote monitoring display 33 and then obtain the access right through the account management unit 323.

Similarly, the universal plug and play signal can include IP address, vendor, models and a port number for each IP camera 31. The user can access the foregoing information through the remote monitoring display 33.

After the image data processing unit 322 processes the image signal, the image signal is stored in a storage device and transmitted to the remote monitoring display 33 through the Internet connected by a router 35. The remote monitoring display 33 respectively displays the image signal captured by each IP camera 31 in multiple divided frames. The user can freely regulate the location at each divided frame upon demand. The screen locking unit 331 of the remote monitoring display 33 can lock the screen and remember the configuration of the user.

It should be noted that the user may not easily recognize that the image displayed by divided frames represents which location of a building. In addition, the user also needs to place the images transmitted by the IP cameras disposed at the same floor of the building to adjacent divided frames. Therefore, if the user does not frequently move the location at each divided frame, daily monitoring task may be influenced due to easily accessed error monitoring information.

The remote monitoring display 33 of the invention has screen locking function. After the user regulates the location at each divided frame, the screen locking unit 331 locks the screen and remembers the physical address of each signal source on the network. At this time, the user needs to input an account number and a password of an administrator to unlock the screen lock such that the user can regulate the location at each divided frame again. After the user completes the regulation, the screen lock will lock the screen again through a predetermine time interval. Even if the NVR is restarted, the user does not need to re-configure the equipment.

Similarly, the user can refuse the NVR 32 to connect to the IP camera 31 through the remote monitoring display 33 to select the preferable IP camera 31 to display the image signal on the remote monitoring display 33.

Figure 4:
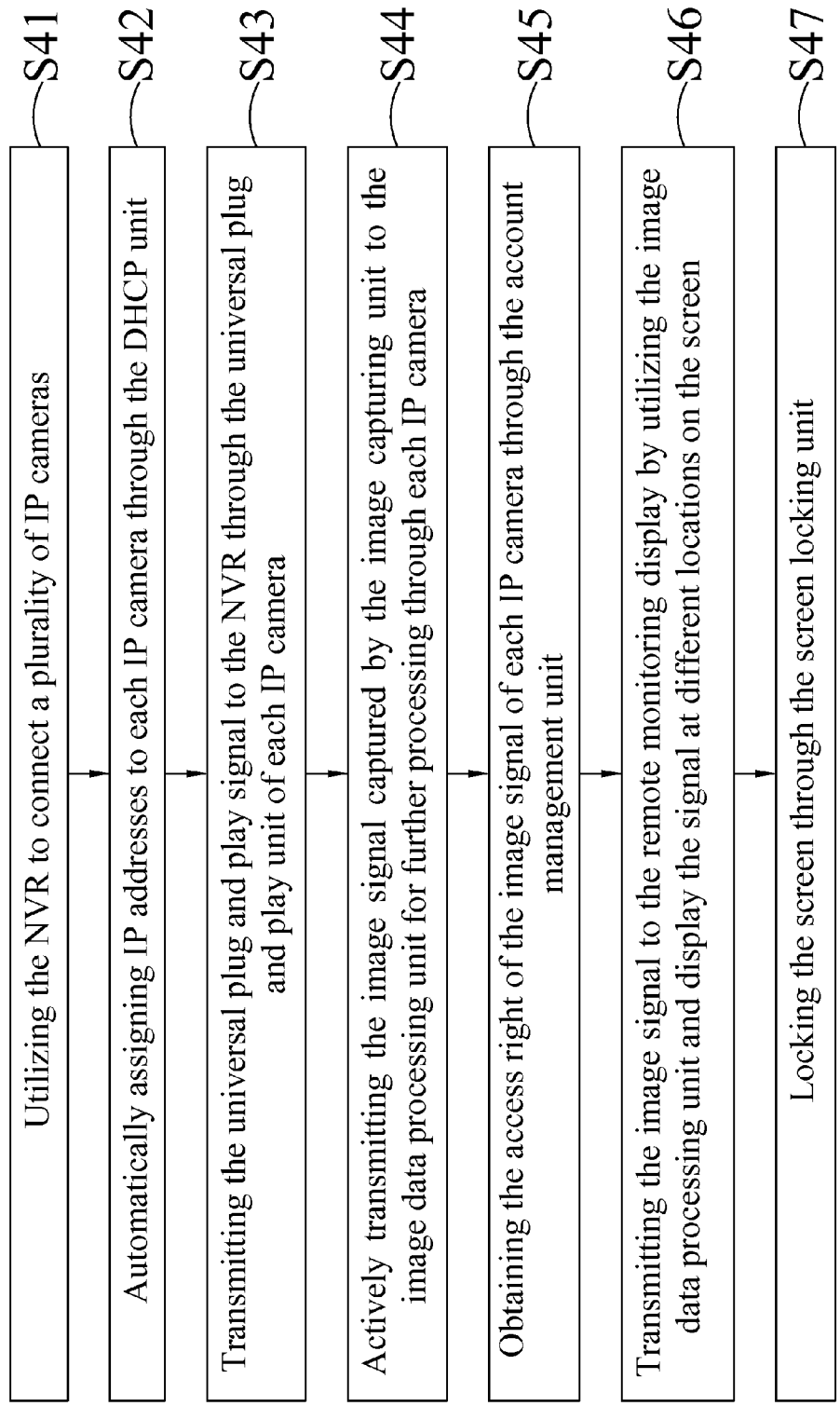
FIG. 4 is a flowchart of a plug and play network monitoring system according to a first embodiment of the invention.

With reference to FIG. 4 for a flowchart of a plug and play network system according to a first embodiment of the invention is depicted.

In step S41, the NVR is utilized to connect to a plurality of IP cameras.

In step S42, IP addresses are automatically assigned to each IP camera through the DHCP unit.

In step S43, the universal plug and play signal is transmitted to the NVR through the universal plug and play unit of each IP camera.

In step S44, the image signal captured by the image capturing unit is actively transmitted to the image data processing unit for further processing through each IP camera.

In step S45, the access right of the image signal of each IP camera is obtained through the account management unit.

In step S46, the image signal is transmitted to the remote monitoring display by utilizing the image data processing unit and displaying the signal at different locations on the screen.

In step S47, the screen is locked through the screen locking unit.

Figure 5A:
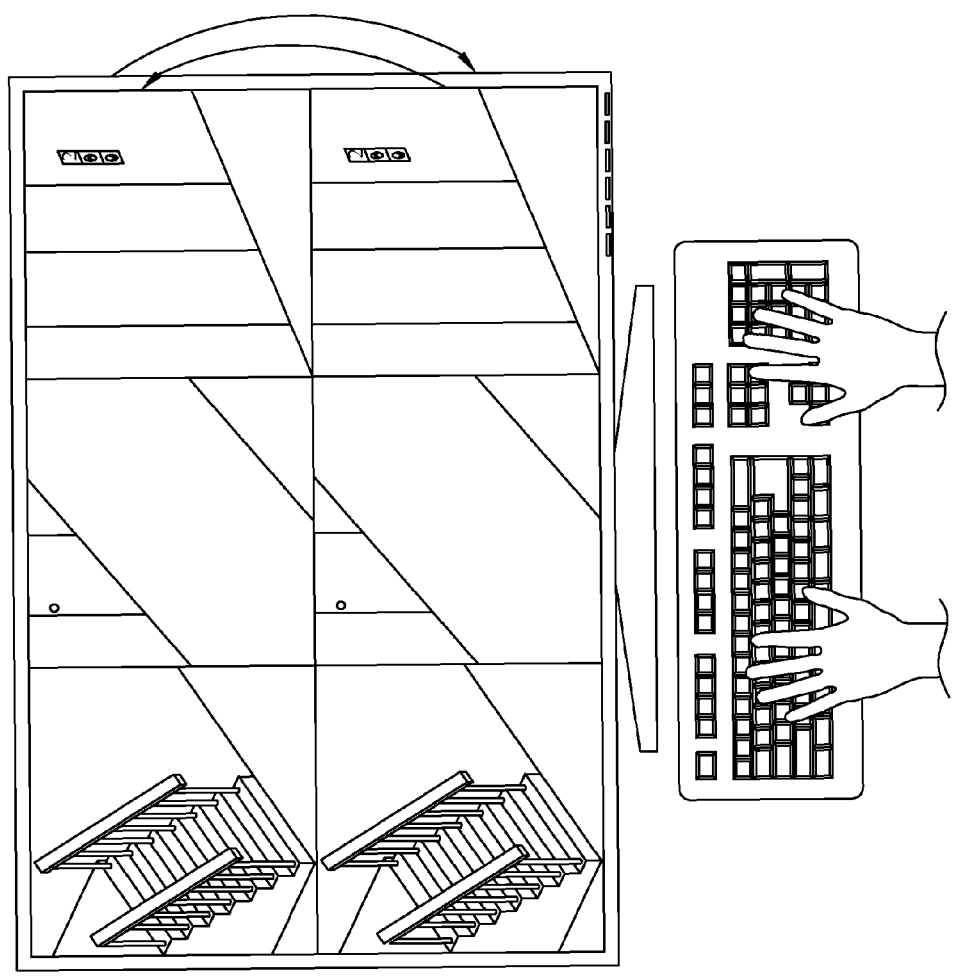
FIG. 5A and FIG. 5B are schematic diagrams of actual application of a plug and play network monitoring system according to the invention.
Figure 5B:
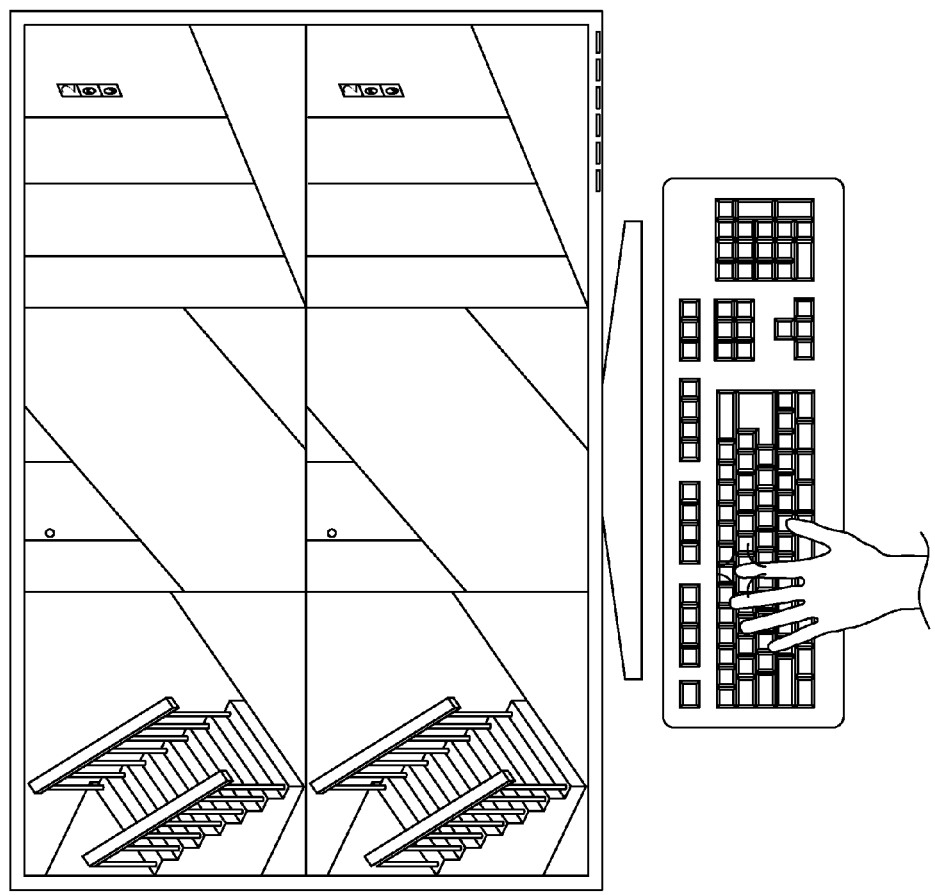

With reference to FIG. 5A and FIG. 5B, for a schematic diagram of actual application of a plug and play network monitoring system is depicted. As shown in FIG. 5A, the user configures the images transmitted by the IP cameras, which are at the same floor of the building, at adjacent divided frames and arranges the images in order according to the sequence escape ladders, aisles, and elevators. As shown in FIG. 5B, the user restarts the NVR. Since the invention has the function of locking screens, the location of each divided frame on the remote monitoring display may not be changed by restarting the machine.

The concept of the control method for the plug and play network system according to the invention has been simultaneously illustrated in the foregoing depictions during the process of depicting the plug and play network system. To clearly depict the concept, the detail depiction is further shown in the following flowchart.

Figure 6:
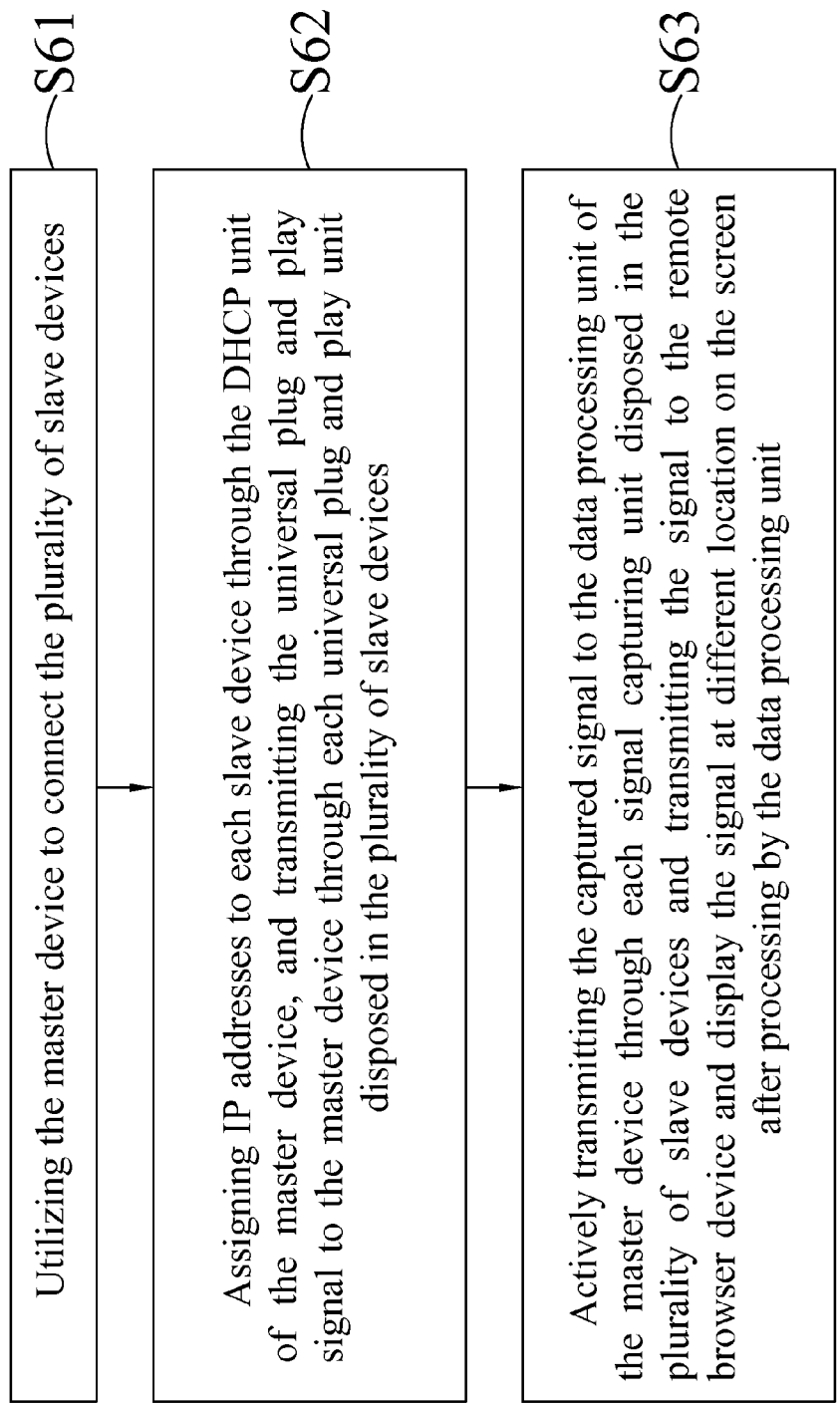
FIG. 6 is a flowchart of a method for controlling plug and play network system according to the invention.

With reference to FIG. 6 for a flowchart of a method for controlling plug and play network system according to the invention is depicted.

In step S61, utilize the master device to connect the plurality of slave devices.

In step S62, assign IP addresses to each slave device through the DHCP unit of the master device, and transmit the universal plug and play signal to the master device through each universal plug and play unit disposed in the plurality of slave devices.

In step S63, actively transmit the captured signal to the data processing unit of the master device through each signal capturing unit disposed in the plurality of slave devices and transmit the signal to the remote browser device and display the signal at different location on the screen after processing by the data processing unit.

The detail depiction and the embodiment of the method for controlling plug and play network system have been depicted in the foregoing depiction of the plug and play network system according to the invention and are not needed to be described herein.

The a plug and play network system, plug and play network monitoring system and its control method integrate the DHCP into the network system. Enormous labor force costs and time can be saved during the installation. In addition, the invention integrates DHCP into the network system. Each slave device would automatically transmit captured signals to increase the convenience. Technical threshold required for installation is low. Moreover, the invention integrates the screen locking unit into the remote browser device. The locations of signals, which are captured by each slave device, displayed on the screen may not be changed when the user wrongly touches the remote browser device. User friendliness is further provided. Therefore, the invention exactly achieves the desired effect under a condition of breaking through the prior arts.

The invention improves over the prior arts and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A plug and play network system comprising:
a remote browser device;
a plurality of slave devices, wherein each of the slave devices comprises a signal capturing unit and an universal plug and play unit; and
a master device comprising a dynamic host configuration protocol (DHCP) unit and a data processing unit;
wherein when the plurality of slave devices is connected to the master device, the master device utilizes the DHCP unit to assign internet protocol addresses to each of the slave devices, and each of the universal plug and play units transmits an universal plug and play signal to the master device such that each of the signal capturing units is capable of actively transmitting captured signals to the data processing unit, and after processing by the data processing unit, the captured signals are transmitted to the remote browser device by the data processing unit and displayed at different locations on a screen,
the remote browser device further comprises a screen locking unit, and when a user regulates the locations of the signal captured by each signal capturing unit on the screen, the screen locking unit locks in a configuration of the user and remember physical locations including the assigned internet protocol addresses of each of the slave devices on the network, and
the master device is configured through an operating interface to the user to refuse connection request from one of the slave that is actively linked when a number of connection requests exceeds a predetermined threshold, wherein the refused connection enables the browser device to automatically find another usable slave device for the user to select a preferable slave device.

2. The plug and play network system as recited in claim 1, wherein the remote browser device sequentially displays the signal captured by each signal capturing unit at different locations on the screen according to a sequence of connecting each slave device to the master device.

3. The plug and play network system as recited in claim 1, wherein the universal plug and play signal transmitted to the master device via each universal plug and play unit comprises an internet protocol address, a slave device model, vendor information defining a vendor of the slave device model and a port number.

4. The plug and play network system as recited in claim 3, wherein the master device further comprises an account management unit, and when the plurality of slave devices is connected to the master device, the account management unit allows the data processing unit to access the signal captured by the signal capturing unit through a predetermined account number and a password or a specific account number and a password inputted by the user.

5. A method for controlling a plug and play network system comprising:
utilizing a master device to connect a plurality of slave devices;
assigning internet protocol addresses to each slave device through a dynamic host configuration protocol (DHCP) unit of the master device;
transmitting an universal plug and play signal to the master device through each universal plug and play unit disposed in the plurality of slave devices; and
actively transmitting a signal captured by each signal capturing unit disposed in the plurality of slave devices to a data processing unit of the master device and then transmitting the signal to a remote browser device by the data processing unit and displaying the signal at different locations on a screen after processing by the data processing unit,
wherein the remote browser device further comprises a screen locking unit, and when a user regulates the locations of the signal, which is captured by each of the signal capturing units, displayed on the screen, the screen locking unit locks in a configuration of the user and remember physical locations including the assigned internet protocol addresses of each of the slave devices on the network, and
configuring the master device through an operating interface to the user to refuse connection request from one of the slave devices that is actively linked when a number of connection requests exceeds a predetermined threshold, wherein the refused connection enables the browser device to automatically find another usable slave device for the user to select a preferable slave device.

6. The method for controlling a plug and play network system as recited in claim 5, further comprising a step of: utilizing the remote browser device to sequentially display the signal captured by each of the signal capturing unit at different location on the screen according to a sequence of connecting each slave device to the master device.

7. The method for controlling a plug and play network system as recited in claim 5, wherein the universal plug and play signal transmitted to the master device via the universal plug and play unit comprises an internet protocol address, a slave device model, vendor information defining a vendor of the slave device model and a port number.

8. The method for controlling a plug and play network system as recited in claim 7, wherein the master device further comprises an account management unit, and when the plurality of slave devices is connected to the master device, the account management unit allows the data processing unit to access the signal captured by the signal capturing unit through a predetermined account number and a password or a specific account number and a password inputted by the user.

9. A plug and play network monitoring system comprising:
   a remote monitoring display;
   a plurality of internet protocol (IP) cameras, wherein each IP camera comprises an image capturing unit and an universal plug and play unit; and
   a network video recorder (NVR) comprising a dynamic host configuration protocol (DHCP) unit and an image data processing unit;
   wherein when the plurality of IP cameras is connected to the NVR, the IP cameras utilize the DHCP unit to assign internet protocol addresses to each of the IP cameras, and each of the universal plug and play units transmits an universal plug and play signal to the NVR such that each of the image capturing units actively transmits a captured image signal to the image data processing unit, and the captured image signal then is transmitted to the remote monitoring display by the image data processing unit and displayed at different locations on a screen after processing by the image data processing unit,
   the remote monitoring display further comprises a screen locking unit, and when a user regulates the locations of the signal, which is captured by each of the image capturing units, displayed on the screen, the screen locking unit locks in a configuration of the user and remember physical locations including the assigned internet protocol addresses of each of the slave devices on the network, and
   the NVR is configured through an operating interface to the user to refuse connection request from one of the IP cameras that is actively linked when a number of connection requests exceeds a predetermined threshold, wherein the refused connection enables the browser device to automatically find another IP camera for the user to select a preferable IP camera.

10. The plug and play network monitoring system as recited in claim 9, wherein the remote monitoring display sequentially displays the captured image signal captured by each of the image capturing unit at the different locations on the screen according to a sequence of connecting each IP camera to the NVR.

11. The plug and play network monitoring system as recited in claim 9, wherein the universal plug and play signal transmitted to the NVR via each of the universal plug and play units comprises an internet protocol address, a slave device model, vendor information defining a vendor of the slave device model and a port number.

12. The plug and play network monitoring system as recited in claim 11, wherein the NVR further comprises an account management unit, and when the plurality of IP cameras is connected to the NVR, the account management unit allows the image data processing unit to access the image signal captured by the image capturing unit through a predetermined account number and a password or a specific account number and a password inputted by the user.

* * * * *